US012457361B2

(12) United States Patent
Wiegand et al.

(10) Patent No.: US 12,457,361 B2
(45) Date of Patent: **\*Oct. 28, 2025**

(54) BIT-DEPTH SCALABILITY

(71) Applicant: DOLBY VIDEO COMPRESSION, LLC, Wilmington, DE (US)

(72) Inventors: Thomas Wiegand, Berlin (DE); Martin Winken, Berlin (DE)

(73) Assignee: Dolby Video Compression, LLC, Wilmington, DE (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/344,329

(22) Filed: Jun. 29, 2023

(65) Prior Publication Data
US 2023/0421806 A1  Dec. 28, 2023

Related U.S. Application Data

(63) Continuation of application No. 17/208,805, filed on Mar. 22, 2021, now Pat. No. 11,711,542, which is a
(Continued)

(51) Int. Cl.
*H04N 19/593* (2014.01)
*H04N 19/117* (2014.01)
(Continued)

(52) U.S. Cl.
CPC ......... *H04N 19/593* (2014.11); *H04N 19/117* (2014.11); *H04N 19/184* (2014.11);
(Continued)

(58) Field of Classification Search
CPC .... H04N 19/117; H04N 19/593; H04N 19/33; H04N 19/82
See application file for complete search history.

(56) References Cited

U.S. PATENT DOCUMENTS 5,963,665 A   10/1999   Kim et al.
6,201,898 B1  3/2001   Takeuchi et al.
(Continued)

FOREIGN PATENT DOCUMENTS

EP   1617679 A2   1/2006
EP   1827024 A1   8/2007
(Continued)

OTHER PUBLICATIONS

Notice of Allowance mailed Jan. 15, 2020 in U.S. Appl. No. 16/190,409.
(Continued)

*Primary Examiner* — Zhubing Ren
(74) *Attorney, Agent, or Firm* — Morgan, Lewis & Bockius LLP

(57) ABSTRACT

To increase efficiency of a bit-depth scalable data-stream an inter-layer prediction is obtained by mapping samples of the representation of the picture or video source data with a first picture sample bit-depth from a first dynamic range corresponding to the first picture sample bit-depth to a second dynamic range greater than the first dynamic range and corresponding to a second picture sample bit-depth being higher than the first picture sample bit-depth by use of one or more global mapping functions being constant within the picture or video source data or varying at a first granularity, and a local mapping function locally modifying the one or more global mapping functions and varying at a second granularity smaller than the first granularity, with forming the quality-scalable data-stream based on the local mapping function such that the local mapping function is derivable from the quality-scalable data-stream.

15 Claims, 7 Drawing Sheets

Related U.S. Application Data continuation of application No. 16/434,286, filed on Jun. 7, 2019, now Pat. No. 10,958,936, which is a continuation of application No. 14/626,946, filed on Feb. 20, 2015, now abandoned, which is a continuation of application No. 12/937,759, filed as application No. PCT/EP2008/003047 on Apr. 16, 2008, now Pat. No. 8,995,525.

(51) Int. Cl.
   *H04N 19/184* (2014.01)
   *H04N 19/33* (2014.01)
   *H04N 19/36* (2014.01)
   *H04N 19/80* (2014.01)
   *H04N 19/82* (2014.01)

(52) U.S. Cl.
   CPC ............. *H04N 19/33* (2014.11); *H04N 19/36* (2014.11); *H04N 19/80* (2014.11); *H04N 19/82* (2014.11)

(56) References Cited

U.S. PATENT DOCUMENTS

| | | | |
|---|---|---|---|
| 6,829,301 | B1 | 12/2004 | Tinker et al. |
| 6,925,120 | B2 | 8/2005 | Zhang et al. |
| 7,146,059 | B1 | 12/2006 | Durand et al. |
| 7,535,383 | B2 | 5/2009 | Segall et al. |
| 7,773,694 | B2 | 8/2010 | Murakami et al. |
| 7,924,921 | B2 | 4/2011 | Crinon |
| 2005/0063471 | A1 | 3/2005 | Regunathan et al. |
| 2005/0105623 | A1 | 5/2005 | Linzer |
| 2005/0259729 | A1 | 11/2005 | Sun |
| 2006/0083308 | A1* | 4/2006 | Schwarz ............... H04N 19/19 375/E7.125 |
| 2006/0197777 | A1 | 9/2006 | Cha et al. |
| 2007/0035706 | A1 | 2/2007 | Margulis |
| 2007/0160133 | A1 | 7/2007 | Bao et al. |
| 2007/0201560 | A1 | 8/2007 | Segall |
| 2008/0002767 | A1 | 1/2008 | Schwarz |
| 2008/0007438 | A1* | 1/2008 | Segall .................... H04N 19/48 375/E7.199 |
| 2009/0003718 | A1* | 1/2009 | Liu ...................... H04N 19/102 345/589 |
| 2009/0097558 | A1 | 4/2009 | Ye et al. |
| 2009/0110073 | A1 | 4/2009 | Wu et al. |
| 2009/0297054 | A1 | 12/2009 | Regunathan et al. |
| 2010/0020866 | A1 | 1/2010 | Marpe et al. |
| 2010/0046622 | A1 | 2/2010 | Doser et al. |
| 2010/0208143 | A1 | 8/2010 | Banterle |
| 2010/0208810 | A1* | 8/2010 | Yin ........................ H04N 19/30 375/E7.243 |
| 2010/0220789 | A1* | 9/2010 | Yuwen ................... H04N 19/33 375/E7.243 |

FOREIGN PATENT DOCUMENTS

| | | |
|---|---|---|
| JP | 10056639 A | 2/1998 |
| WO | 2004045217 A1 | 5/2004 |
| WO | 2008043198 A1 | 4/2008 |

OTHER PUBLICATIONS

Office Action mailed Aug. 15, 2019 in U.S. Appl. No. 16/190,409.
"Advanced Video Coding for Generic Audiovisual Services," ITU-T Recommendation H.264; Series H: Audiovisual and Multimedia Systems; Infrastructure of audiovisual services—Coding of moving video; Mar. 2005; 343 pages.
"Information Technology—Coding of Audio-Visual Objects—Part 2: Visual," International Organization for Standarization; Jul. 2001; 539 pages.
Conklin et al.: "Dithering 5-TAP Filter for Inloop Deblocking," XP-002308744; Joint Video Team (JVT) of ISO/IEC MPEG & ITU-T VCEG; Date Saved: May 1, 2002; pp. 1-16.
Erdem et al.: "Compression of 10-BIT Video Using the Tools of MPEG -2," XP-000495183; Signal Processing: Image Communication; vol. 7, No. 1; Mar. 1, 1995; pp. 27-56.
Liu et al., "Inter-layer Prediction for SVC Bit-depth Scalability", Joint Vide Team (JVT) of ISO/IEC MPEG & ITU-T VCEG, 24th Meeting: Geneva, CH, Jun. 26, 2007, pp. 1-12.
Marpe et al., "Quality Scalable Coding", U.S. Appl. No. 12/447,005, filed Apr. 24, 2009.
Marpe et al.: "The H.264/MPEG4 Advanced Video Coding Standard and Its Application," IEEE Communications Magazine; Aug. 2006; pp. 134-143.
Official communication issued in counterpart International Application No. PCT/EP2006/010277, mailed on Jul. 30, 2007.
Official communication issued in counterpart International Application No. PCT/EP2006010297, mailed on Jun. 12, 2007.
Reichel et al.: "Joint Scalable Video Model JSVM-7." Joint Video Team (JVT) of ISO/IEC MPEG & ITU-T VCEG; Jul. 2006; 1,148 pages.
Segall et al., "System for Bit-Depth Scalable Coding", Joint Video Team (JVT) of ISO/IEC MPEG & ITU-T VCEG, 23rd Meeting: San Jose, CA, Apr. 17, 2007, pp. 1-7.
Segall et al.: "Tone Mapping Sei Message," XP-002436792; Joint Video Team (JVT) of ISO/IEC MPEG & ITU-T VCEG; Date Saved: Mar. 30, 2006; pp. 1-12.
Wiegand et al., "Bit-Depth Scalability", U.S. Appl. No. 12/937,759, filed Dec. 16, 2010.
Wiegand et al.: "Joint Draft 7 of SVC Amendment," Joint Video Team (JVT) of ISO/IEC MPEG & ITU-T VCEG; Jul. 2006; 1,674 pages.
Winken et al., Bit-Depth Scalable Video Coding, IEEE International Conference on Image Processing, 2007, pp. 1-5-1-8.
Ying et al.: "4:2:0 Chroma Sample Format for Phase Difference Eliminating and Color Space Scalability," XP-002362574; Joint Video Team (JVT) of ISO/IEC MPEG & ITU-T VCEG; Date Saved: Apr. 12, 2005; pp. 1-13.
Ying et al.: "New Downsampling and Upsampling Processes for Chroma Samples in SVC Spatial Scalability," XP-002436793; Joint Video Team (JVT) of ISO/IEC MPEG & ITU-T VCEG; Date Saved: Apr. 12, 2005; pp. 1-7.
Office Action issued Dec. 6, 2016 in U.S. Appl. No. 14/324,425.
Office Action issued Jul. 21, 2017 in U.S. Appl. No. 14/686,946.
Notice of Allowance dated Aug. 14, 2018 in U.S. Appl. No. 15/803,310.
Non-final Office Action U.S. Appl. No. 14/626,946 dated Nov. 8, 2018.
Search Report EP Application No. 18211119.5 dated Apr. 5, 2019.
Communication Pursuant to Article 94(3) EPC issued in corresponding European Application No. 18 211 119.5 issued Jun. 28, 2021.

\* cited by examiner

BIT-DEPTH SCALABILITY

CROSS REFERENCE TO RELATED APPLICATIONS

This application is a continuation of U.S. Ser. No. 17/208,805, filed Mar. 22, 2021, which is a continuation of U.S. Ser. No. 16/434,286, filed Jun. 7, 2019, now U.S. Pat. No. 10,958,936, which is a continuation of U.S. Ser. No. 14/626,946, filed Feb. 20, 2015, which is a continuation of U.S. application Ser. No. 12/937,759, filed Dec. 16, 2010, now U.S. Pat. No. 8,995,525, which is a continuation of International Application No. PCT/EP2008/003047, filed Apr. 16, 2008. Each of the foregoing patents and patent applications is incorporated herein by reference in entirety.

BACKGROUND OF THE INVENTION

The present invention is concerned with picture and/or video coding, and in particular, quality-scalable coding enabling bit-depth scalability using quality-scalable data streams.

The Joint Video Team (JVT) of the ISO/IEC Moving Pictures Experts Group (MPEG) and the ITU-T Video Coding Experts Group (VCEG) have recently finalized a scalable extension of the state-of-the-art video coding standard H.264/AVC called Scalable Video Coding (SVC). SVC supports temporal, spatial and SNR scalable coding of video sequences or any combination thereof.

H.264/AVC as described in ITU-T Rec. & ISO/IEC 14496-10 AVC, "Advanced Video Coding for Generic Audiovisual Services," version 3, 2005, specifies a hybrid video codec in which macroblock prediction signals are either generated in the temporal domain by motion-compensated prediction, or in the spatial domain by intra prediction, and both predictions are followed by residual coding. H.264/AVC coding without the scalability extension is referred to as single-layer H.264/AVC coding. Rate-distortion performance comparable to single-layer H.264/AVC means that the same visual reproduction quality is typically achieved at 10% bit-rate. Given the above, scalability is considered as a functionality for removal of parts of the bit-stream while achieving an R-D performance at any supported spatial, temporal or SNR resolution that is comparable to single-layer H.264/AVC coding at that particular resolution.

The basic design of the scalable video coding (SVC) can be classified as a layered video codec. In each layer, the basic concepts of motion-compensated prediction and intra prediction are employed as in H.264/AVC. However, additional inter-layer prediction mechanisms have been integrated in order to exploit the redundancy between several spatial or SNR layers. SNR scalability is basically achieved by residual quantization, while for spatial scalability, a combination of motion-compensated prediction and over-sampled pyramid decomposition is employed. The temporal scalability approach of H.264/AVC is maintained.

In general, the coder structure depends on the scalability space that is necessitated by an application. For illustration, FIG. 8 shows a typical coder structure 900 with two spatial layers 902a, 902b. In each layer, an independent hierarchical motion-compensated prediction structure 904a,b with layer-specific motion parameters 906a,b is employed. The redundancy between consecutive layers 902a,b is exploited by inter-layer prediction concepts 908 that include prediction mechanisms for motion parameters 906a,b as well as texture data 910a,b. A base representation 912a,b of the input pictures 914a,b of each layer 902a,b is obtained by transform coding 916a,b similar to that of H.264/AVC, the corresponding NAL units (NAL—Network Abstraction Layer) contain motion information and texture data; the NAL units of the base representation of the lowest layer, i.e. 912a, are compatible with single-layer H.264/AVC.

The resulting bit-streams output by the base layer coding 916a,b and the progressive SNR refinement texture coding 918a,b of the respective layers 902a,b, respectively, are multiplexed by a multiplexer 920 in order to result in the scalable bit-stream 922. This bit-stream 922 is scalable in time, space and SNR quality.

Summarizing, in accordance with the above scalable ex-tension of the Video Coding Standard H.264/AVC, the temporal scalability is provided by using a hierarchical prediction structure. For this hierarchical prediction structure, the one of single-layer H.264/AVC standards may be used without any changes. For spatial and SNR scalability, additional tools have to be added to the single-layer H.264/MPEG4.AVC as described in the SVC extension of H.254/AVC. All three scalability types can be combined in order to generate a bit-stream that supports a large degree on combined scalability.

Problems arise when a video source signal has a different dynamic range than necessitated by the decoder or player, respectively. In the above current SVC standard, the scalability tools are only specified for the case that both the base layer and enhancement layer represent a given video source with the same bit depth of the corresponding arrays of luma and/or chroma samples. Hence, considering different decoders and players, respectively, requiring different bit depths, several coding streams dedicated for each of the bit depths would have to be provided separately. However, in rate/distortion sense, this means an increased overhead and reduced efficiency, respectively.

There have already been proposals to add a scalability in terms of bit-depth to the SVC Standard. For example, Shan Liu et al. describe in the input document to the JV—namely JVT-X075—the possibility to derive a an inter-layer prediction from a lower bit-depth representation of a base layer by use of an inverse tone mapping according to which an inter-layer predicted or inversely tone-mapped pixel value p' is calculated from a base layer pixel value $p_b$ by $p'=p_b \cdot scale+offset$ with stating that the inter-layer prediction would be performed on macro blocks or smaller block sizes. In JVT-Y067 Shan Liu, presents results for this inter-layer prediction scheme. Similarly, Andrew Segall et al. propose in JVT-X071 an inter-layer prediction for bit-depth scalability according to which a gain plus offset operation is used for the inverse tone mapping. The gain parameters are indexed and transmitted in the enhancement layer bit-stream on a block-by-block basis. The signaling of the scale factors and offset factors is accomplished by a combination of prediction and refinement. Further, it is described that high level syntax supports coarser granularities than the transmission on a block-by-block basis. Reference is also made to Andrew Segall "Scalable Coding of High Dynamic Range Video" in ICIP 2007, 1-1 to 1-4 and the JVT document, JVT-X067 and JVT-W113, also stemming from Andrew Segall.

Although the above-mentioned proposals for using an in-verse tone-mapping in order to obtain a prediction from a lower bit-depth base layer, remove some of the redundancy between the lower bit-depth information and the higher bit-depth information, it would be favorable to achieve an even better efficiency in providing such a bit-depth scalable bit-stream, especially in the sense of rate/distortion performance.

SUMMARY

According to an embodiment, an encoder for encoding a picture or video source data into a quality-scalable data stream may have a base encoder for encoding the picture or video source data into a base encoding data stream representing a representation of the picture or video source data with a first picture sample bit depth; a mapper for mapping samples of the representation of the picture or video source data with the first picture sample bit depth from a first dynamic range corresponding to the first picture sample bit depth to a second dynamic range greater than the first dynamic range and corresponding to a second picture sample bit depth being higher than the first picture sample bit depth, by use of one or more global mapping functions being constant within the picture or video source data or varying at a first granularity, and a local mapping function locally modifying the one or more global mapping functions at a second granularity finer than the first granularity to acquire a prediction of the picture or video source data having the second picture sample bit depth; a residual encoder for encoding a prediction residual of the prediction into a bit-depth enhancement layer data stream; and a combiner for forming the quality-scalable data stream based on the base encoding data stream, the local mapping function and the bit-depth enhancement layer data stream so that the local mapping function is derivable from the quality-scalable data stream.

According to another embodiment, a decoder for decoding a quality-scalable data stream into which picture or video source data is encoded, the quality-scalable data stream having a base layer data stream representing the picture or video source data with a first picture sample bit depth, a bit-depth enhancement layer data stream representing a prediction residual with a second picture sample bit depth being higher than the first picture sample bit depth, and a local mapping function defined at a second granularity may have a decoder for decoding the base layer data stream into a lower bit-depth reconstructed picture or video data; a decoder for decoding the bit-depth enhancement data stream into the prediction residual; a mapper for mapping samples of the lower bit-depth reconstructed picture or video data with the first picture sample bit depth from a first dynamic range corresponding to the first picture sample bit depth to a second dynamic range greater than the first dynamic range and corresponding to the second picture sample bit depth, by use of one or more global mapping functions being constant within the video or varying at a first granularity, and a local mapping function locally modifying the one or more global mapping functions at the second granularity being smaller than the first granularity, to acquire a prediction of the picture or video source data having the second picture sample bit depth; and a reconstructor for reconstructing the picture with the second picture sample bit depth based on the prediction and the prediction residual.

According to another embodiment, a method for encoding a picture or video source data into a quality-scalable data stream may have the steps of encoding the picture or video source data into a base encoding data stream representing a representation of the picture or video source data with a first picture sample bit depth; mapping samples of the representation of the picture or video source data with the first picture sample bit depth from a first dynamic range corresponding to the first picture sample bit depth to a second dynamic range greater than the first dynamic range and corresponding to a second picture sample bit depth being higher than the first picture sample bit depth, by use of one or more global mapping functions being constant within the picture or video source data or varying at a first granularity, and a local mapping function locally modifying the one or more global mapping functions at a second granularity finer than the first granularity to acquire a prediction of the picture or video source data having the second picture sample bit depth; encoding a prediction residual of the prediction into a bit-depth enhancement layer data stream; and forming the quality-scalable data stream based on the base encoding data stream, the local mapping function and the bit-depth enhancement layer data stream so that the local mapping function is derivable from the quality-scalable data stream.

According to another embodiment, a method for decoding a quality-scalable data stream into which picture or video source data is encoded, the quality-scalable data stream having a base layer data stream representing the picture or video source data with a first picture sample bit depth, a bit-depth enhancement layer data stream representing a prediction residual with a second picture sample bit depth being higher than the first picture sample bit depth, and a local mapping function defined at a second granularity may have the steps of decoding the base layer data stream into a lower bit-depth reconstructed picture or video data; decoding the bit-depth enhancement data stream into the prediction residual; mapping samples of the lower bit-depth reconstructed picture or video data with the first picture sample bit depth from a first dynamic range corresponding to the first picture sample bit depth to a second dynamic range greater than the first dynamic range and corresponding to the second picture sample bit depth, by use of one or more global mapping functions being constant within the video or varying at a first granularity, and a local mapping function locally modifying the one or more global mapping functions at the second granularity being smaller than the first granularity, to acquire a prediction of the picture or video source data having the second picture sample bit depth; and reconstructing the picture with the second picture sample bit depth based on the prediction and the prediction residual.

According to another embodiment, a quality-scalable data stream into which picture or video source data is encoded may have a base layer data stream representing the picture or video source data with a first picture sample bit depth, a bit-depth enhancement layer data stream representing a prediction residual with a second picture sample bit depth being higher than the first picture sample bit depth, and a local mapping function defined at a second granularity, wherein a reconstruction of the picture with the second picture sample bit depth is derivable from the prediction residual and a prediction acquired by mapping samples of the lower bit-depth reconstructed picture or video data with the first picture sample bit depth from a first dynamic range corresponding to the first picture sample bit depth to a second dynamic range greater than the first dynamic range and corresponding to the second picture sample bit depth, by use of one or more global mapping functions being constant within the video or varying at a first granularity, and the local mapping function locally modifying the one or more global mapping functions at the second granularity being smaller than the first granularity.

According to another embodiment, a computer-program may have a program code for performing, when running on a computer, a method for encoding a picture or video source data into a quality-scalable data stream which may have the steps of encoding the picture or video source data into a base encoding data stream representing a representation of the picture or video source data with a first picture sample bit depth; mapping samples of the representation of the picture or video source data with the first picture sample bit depth from a first dynamic range corresponding to the first picture sample bit depth to a second dynamic range greater than the first dynamic range and corresponding to a second picture sample bit depth being higher than the first picture sample bit depth, by use of one or more global mapping functions being constant within the picture or video source data or varying at a first granularity, and a local mapping function locally modifying the one or more global mapping functions at a second granularity finer than the first granularity to acquire a prediction of the picture or video source data having the second picture sample bit depth; encoding a prediction residual of the prediction into a bit-depth enhancement layer data stream; and forming the quality-scalable data stream based on the base encoding data stream, the local mapping function and the bit-depth enhancement layer data stream so that the local mapping function is derivable from the quality-scalable data stream.

According to another embodiment, a computer-program may have a program code for performing, when running on a computer, a method for decoding a quality-scalable data stream into which picture or video source data is encoded, the quality-scalable data stream having a base layer data stream representing the picture or video source data with a first picture sample bit depth, a bit-depth enhancement layer data stream representing a prediction residual with a second picture sample bit depth being higher than the first picture sample bit depth, and a local mapping function defined at a second granularity, which may have the steps of decoding the base layer data stream into a lower bit-depth reconstructed picture or video data; decoding the bit-depth enhancement data stream into the prediction residual; mapping samples of the lower bit-depth reconstructed picture or video data with the first picture sample bit depth from a first dynamic range corresponding to the first picture sample bit depth to a second dynamic range greater than the first dynamic range and corresponding to the second picture sample bit depth, by use of one or more global mapping functions being constant within the video or varying at a first granularity, and a local mapping function locally modifying the one or more global mapping functions at the second granularity being smaller than the first granularity, to acquire a prediction of the picture or video source data having the second picture sample bit depth; and reconstructing the picture with the second picture sample bit depth based on the prediction and the prediction residual.

The present invention is based on the finding that the efficiency of a bit-depth scalable data-stream may be increased when an inter-layer prediction is obtained by mapping samples of the representation of the picture or video source data with a first picture sample bit-depth from a first dynamic range corresponding to the first picture sample bit-depth to a second dynamic range greater than the first dynamic range and corresponding to a second picture sample bit-depth being higher than the first picture sample bit-depth by use of one or more global mapping functions being constant within the picture or video source data or varying at a first granularity, and a local mapping function locally modifying the one or more global mapping functions and varying at a second granularity smaller than the first granularity, with forming the quality-scalable data-stream based on the local mapping function such that the local mapping function is derivable from the quality-scalable data-stream. Although the provision of one or more global mapping functions in addition to a local mapping function which, in turn, locally modifies the one or more global mapping functions, prime-facie increases the amount of side information within the scalable data-stream, this increase is more than recompensated by the fact that this subdivision into a global mapping function on the one hand and a local mapping function on the other hand enables that the local mapping function and its parameters for its parameterization may be small and are, thus, codeable in a highly efficient way. The global mapping function may be coded within the quality-scalable data-stream and, since same is constant within the picture or video source data or varies at a greater granularity, the overhead or flexibility for defining this global mapping function may be increased so that this global mapping function may be precisely fit to the average statistics of the picture or video source data, thereby further decreasing the magnitude of the local mapping function.

BRIEF DESCRIPTION OF THE DRAWINGS

In the following, embodiments of the present application are described with reference to the Figs. In particular, as it is shown in FIG. 1 a block diagram of a video encoder according to an embodiment of the present invention.

DETAILED DESCRIPTION OF THE INVENTION

Figure 1:
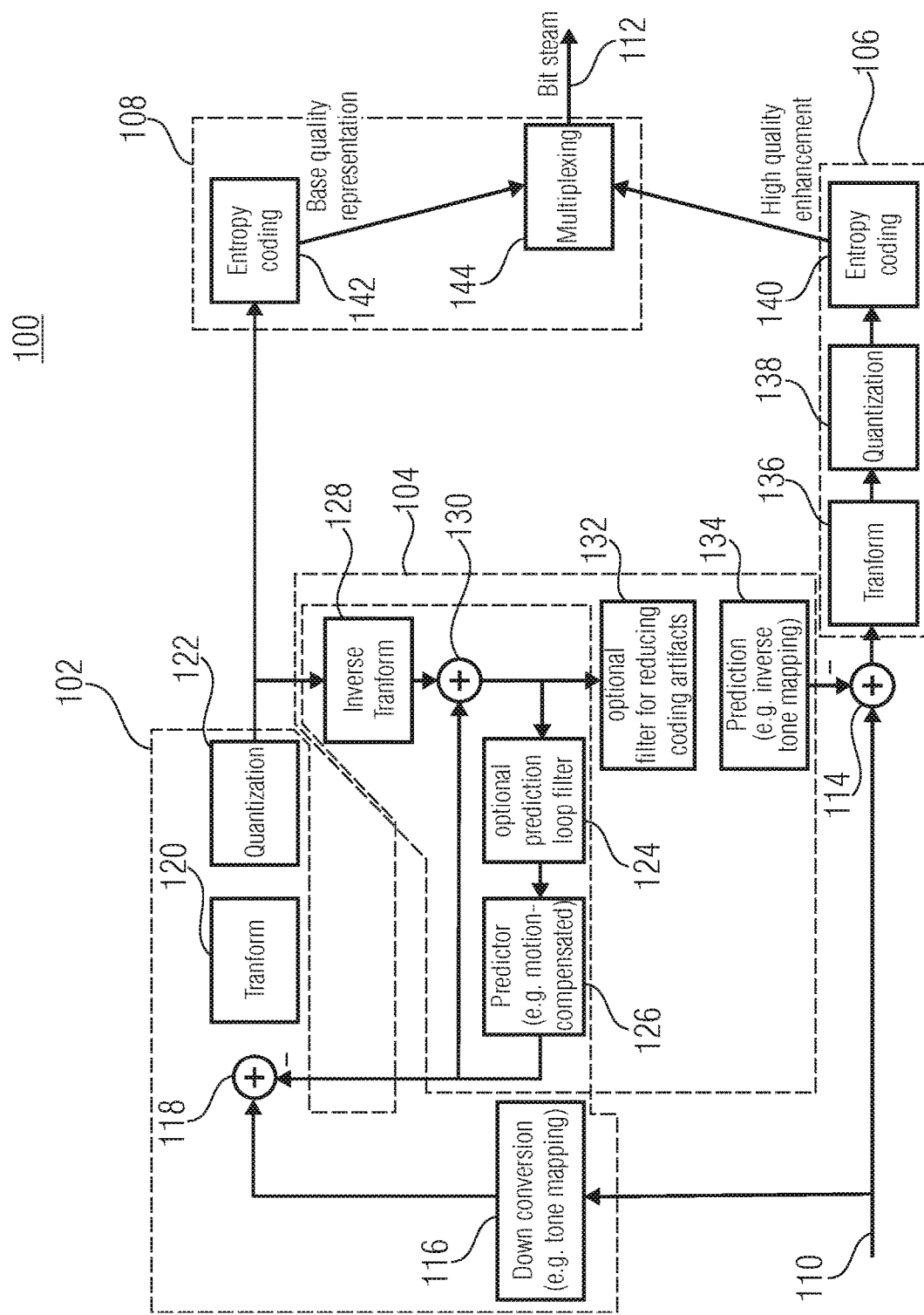

FIG. 1 shows an encoder 100 comprising a base encoding means 102f a prediction means 104, a residual encoding means 106 and a combining means 108 as well as an input 110 and an output 112. The encoder 100 of FIG. 1 is a video encoder receiving a high quality video signal at input 110 and outputting a quality-scalable bit stream at output 112. The base encoding means 102 encodes the data at input 110 into a base encoding data stream representing the content of this video signal at input 110 with a reduced picture sample bit-depth and, optionally, a decreased spatial resolution compared to the input signal at input 110. The prediction means 104 is adapted to, based on the base encoding data stream output by base encoding means 102, provide a prediction signal with full or increased picture sample bit-depth and, optionally, full or increased spatial resolution for the video signal at input 110. A subtractor 114 also comprised by the encoder 100 forms a prediction residual of the prediction signal provided by means 104 relative to the high quality input signal at input 110, the residual signal being encoded by the residual encoding means 106 into a quality enhancement layer data stream. The combining means 108 combines the base encoding data stream from the base encoding means 102 and the quality enhancement layer data stream output by residual encoding means 106 to form a quality scalable data stream 112 at the output 112. The quality-scalability means that the data stream at the output 112 is composed of a part that is self-contained in that it enables a reconstruction of the video signal 110 with the reduced bit-depth and, optionally, the reduced spatial resolution without any further information and with neglecting the remainder of the data stream 112, on the one hand and a further part which enables, in combination with the first part, a reconstruction of the video signal at input 110 in the original bit-depth and original spatial resolution being higher than the bit depth and/or spatial resolution of the first part.

After having rather generally described the structure and the functionality of encoder 100, its internal structure is described in more detail below. In particular, the base encoding means 102 comprises a down conversion module 116, a subtracter 118, a transform module 120 and a quantization module 122 serially connected, in the order mentioned, between the input 110, and the combining means 108 and the prediction means 104, respectively. The down conversion module 116 is for reducing the bit-depth of the picture samples of and, optionally, the spatial resolution of the pictures of the video signal at input 110. In other words, the down conversion module 116 irreversibly down-converts the high quality input video signal at input 110 to a base quality video signal. As will be described in more detail below, this down-conversion may include reducing the bit-depth of the signal samples, i.e. pixel values, in the video signal at input 110 using any tone-mapping scheme, such as rounding of the sample values, sub-sampling of the chroma components in case the video signal is given in the form of luma plus chroma components, filtering of the input signal at input 110, such as by a RGB to YCbCr conversion, or any combination thereof. More details on possible prediction mechanisms are presented in the following. In particular, it is possible that the down-conversion module 116 uses different down-conversion schemes for each picture of the video signal or picture sequence input at input 110 or uses the same scheme for all pictures. This is also discussed in more detail below.

The subtractor 118, the transform module 120 and the quantization module 122 co-operate to encode the base quality signal output by down-conversion module 116 by the use of, for example, a non-scalable video coding scheme, such as H.264/AVC. According to the example of FIG. 1, the subtractor 118, the transform module 120 and the quantization module 122 co-operate with an optional prediction loop filter 124, a predictor module 126, an inverse transform module 128, and an adder 130 commonly comprised by the base encoding means 102 and the prediction means 104 to form the irrelevance reduction part of a hybrid encoder which encodes the base quality video signal output by down-conversion module 116 by motion-compensation based prediction and following compression of the prediction residual. In particular, the subtractor 118 subtracts from a current picture or macroblock of the base quality video signal a predicted picture or predicted macroblock portion reconstructed from previously encoded pictures of the base quality video signal by, for example, use of motion compensation. The transform module 120 applies a transform on the prediction residual, such as a DCT, FFT or wavelet transform. The transformed residual signal may represent a spectral representation and its transform coefficients are irreversibly quantized in the quantization module 122. The resulting quantized residual signal represents the residual of the base-encoding data stream output by the base-encoding means 102.

Apart from the optional prediction loop filter 124 and the predictor module 126, the inverse transform module 128, and the adder 130, the prediction means 104 comprises an optional filter for reducing coding artifacts 132 and a prediction module 134. The inverse transform module 128, the adder 130, the optional prediction loop filter 124 and the predictor module 126 cooperate to reconstruct the video signal with a reduced bit-depth and, optionally, a reduced spatial resolution, as defined by the down-conversion module 116. In other words, they create a low bit-depth and, optionally, low spatial resolution video signal to the optional filter 132 which represents a low quality representation of the source signal at input 110 also being reconstructable at decoder side. In particular, the inverse transform module 128 and the adder 130 are serially connected between the quantization module 122 and the optional filter 132, whereas the optional prediction loop filter 124 and the prediction module 126 are serially connected, in the order mentioned, between an output of the adder 130 as well as a further input of the adder 130. The output of the predictor module 126 is also connected to an inverting input of the subtractor 118. The optional filter 132 is connected between the output of adder 130 and the prediction module 134, which, in turn, is connected between the output of optional filter 132 and the inverting input of subtractor 114.

The inverse transform module 128 inversely transforms the base-encoded residual pictures output by base-encoding means 102 to achieve low bit-depth and, optional, low spatial resolution residual pictures. Accordingly, inverse transform module 128 performs an inverse transform being an inversion of the transformation and quantization performed by modules 120 and 122. Alternatively, a de-quantization module may be separately provided at the input side of the inverse transform module 128. The adder 130 adds a prediction to the reconstructed residual pictures, with the prediction being based on previously reconstructed pictures of the video signal. In particular, the adder 130 outputs a reconstructed video signal with a reduced bit-depth and, optionally, reduced spatial resolution. These reconstructed pictures are filtered by the loop filer 124 for reducing artifacts, for example, and used thereafter by the predictor module 126 to predict the picture currently to be reconstructed by means of, for example, motion compensation, from previously reconstructed pictures. The base quality signal thus obtained at the output of adder 130 is used by the serial connection of the optional filter 132 and prediction module 134 to get a prediction of the high quality input signal at input 110, the latter prediction to be used for forming the high quality enhancement signal at the output of the residual encoding means 106. This is described in more detail below.

In particular, the low quality signal obtained from adder 130 is optionally filtered by optional filter 132 for reducing coding artifacts. Filters 124 and 132 may even operate the same way and, thus, although filters 124 and 132 are separately shown in FIG. 1, both may be replaced by just one filter arranged between the output of adder 130 and the input of prediction module 126 and prediction module 134, respectively. Thereafter, the low quality video signal is used by prediction module 134 to form a prediction signal for the high quality video signal received at the non-inverting input of adder 114 being connected to the input 110. This process of forming the high quality prediction may include mapping the decoded base quality signal picture samples by use of a combined mapping function as described in more detail below, using the respective value of the base quality signal samples for indexing a look-up table which contains the corresponding high quality sample values, using the value of the base quality signal sample for an interpolation process to obtain the corresponding high quality sample value, up-sampling of the chroma components, filtering of the base quality signal by use of, for example, YCbCr to RGB conversion, or any combination thereof. Other examples are described in the following.

For example, the prediction module 134 may map the samples of the base quality video signal from a first dynamic range to a second dynamic range being higher than the first dynamic range and, optionally, by use of a spatial interpolation filter, spatially interpolate samples of the base quality video signal to increase the spatial resolution to correspond with the spatial resolution of the video signal at the input 110. In a way similar to the above description of the down-conversion module 116, it is possible to use a different prediction process for different pictures of the base quality video signal sequence as well as using the same prediction process for all the pictures.

The subtracter 114 subtracts the high quality prediction received from the prediction module 134 from the high quality video signal received from input 110 to output a prediction residual signal of high quality, i.e. with the original bit-depth and, optionally, spatial resolution to the residual encoding means 106. At the residual encoding means 106, the difference between the original high quality input signal and the prediction derived from the decoded base quality signal is encoded exemplarily using a compression coding scheme such as, for example, specified in H.264/AVC. To this end, the residual encoding means 106 of FIG. 1 comprises exemplarily a transform module 135, a quantization module 138 and an entropy coding module 140 connected in series between an output of the subtracter 114 and the combining means 108 in the mentioned order. The transform module 136 transforms the residual signal or the pictures thereof, respectively, into a transformation domain or spectral domain, respectively, where the spectral components are quantized by the quantization module 138 and with the quantized transform values being entropy coded by the entropy-coding module 140. The result of the entropy coding represents the high quality enhancement layer data stream output by the residual encoding means 106. If modules 136 to 140 implement an H.264/AVC coding, which supports transforms with a size of 4×4 or 8×8 samples for coding the luma content, the transform size for transforming the luma component of the residual signal from the subtracter 114 in the transform module 136 may arbitrarily be chosen for each macroblock and does not necessarily have to be the same as used for coding the base quality signal in the transform module 120. For coding the chroma components, the H.264/AVC standard, provides no choice. When quantizing the transform coefficients in the quantization module 138, the same quantization scheme as in the H.264/AVC may be used, which means that the quantizer step-size may be controlled by a quantization parameter QP, which can take values from −6*(bit depth of high quality video signal component-8) to 51. The QP used for coding the base quality representation macroblock in the quantization module 122 and the QP used for coding the high quality enhancement macroblock in the quantization module 138 do not have to be the same.

Combining means 108 comprises an entropy coding module 142 and the multiplexer 144. The entropy-coding module 142 is connected between an output of the quantization module 122 and a first input of the multiplexer 144, whereas a second input of the multiplexer 144 is connected to an output of entropy coding module 140. The output of the multiplexer 144 represents output 112 of encoder 100.

The entropy encoding module 142 entropy encodes the quantized transform values output by quantization module 122 to form a base quality layer data stream from the base encoding data stream output by quantization module 122. Therefore, as mentioned above, modules 118, 120, 122, 124, 126, 128, 130 and 142 may be designed to co-operate in accordance with the H.264/AVC, and represent together a hybrid coder with the entropy coder 142 performing a lossless compression of the quantized prediction residual.

The multiplexer 144 receives both the base quality layer data stream and the high quality layer data stream and puts them together to form the quality-scalable data stream.

Figure 3:
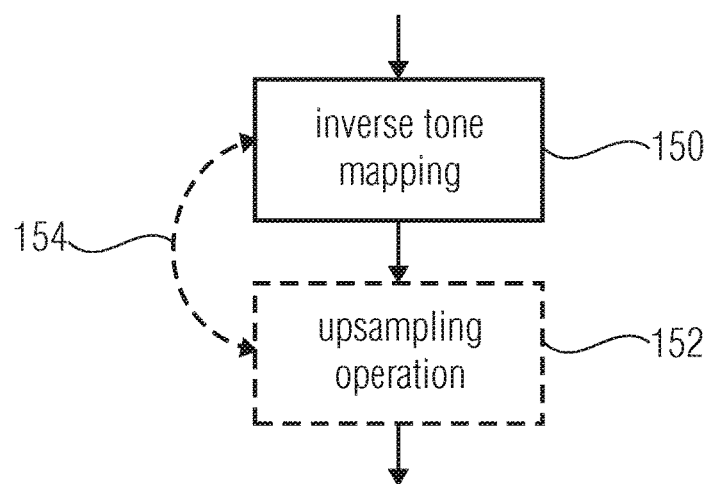
FIG. 3 a flow diagram for a possible implementation of a mode of operation of the prediction module 134 of FIG. 1 according to an embodiment.

As already described above, and as shown in FIG. 3, the way in which the prediction module 134 performs the prediction from the reconstructed base quality signal to the high quality signal domain may include an expansion of sample bit-depth, also called an inverse tone mapping 150 and, optionally, a spatial up-sampling operation, i.e. an upsampling filtering operation 152 in case base and high quality signals are of different spatial resolution. The order in which prediction module 134 performs the inverse tone mapping 150 and the optional spatial up-sampling operation 152 may be fixed and, accordingly, ex ante be known to both encoder and decoder sides, or it can be adaptively chosen on a block-by-block or picture-by-picture basis or some other granularity, in which case the prediction module 134 signals information on the order between steps 150 and 152 used, to some entity, such as the coder 106, to be introduced as side information into the bit stream 112 so as to be signaled to the decoder side as part of the side information. The adaptation of the order among steps 150 and 152 is illustrated in FIG. 3 by use of a dotted double-headed arrow 154 and the granularity at which the order may adaptively be chosen may be signaled as well and even varied within the video.

In performing the inverse tone mapping 150, the prediction module 134 uses two parts, namely one or more global inverse tone mapping functions and a local adaptation thereof. Generally, the one or more global inverse tone mapping functions are dedicated for accounting for the general, average characteristics of the sequence of pictures of the video and, accordingly, of the tone mapping which has initially been applied to the high quality input video signal to obtain the base quality video signal at the down conversion module 116. Compared thereto, the local adaptation shall account for the individual deviations from the global inverse tone mapping model for the individual blocks of the pictures of the video.

Figure 4:
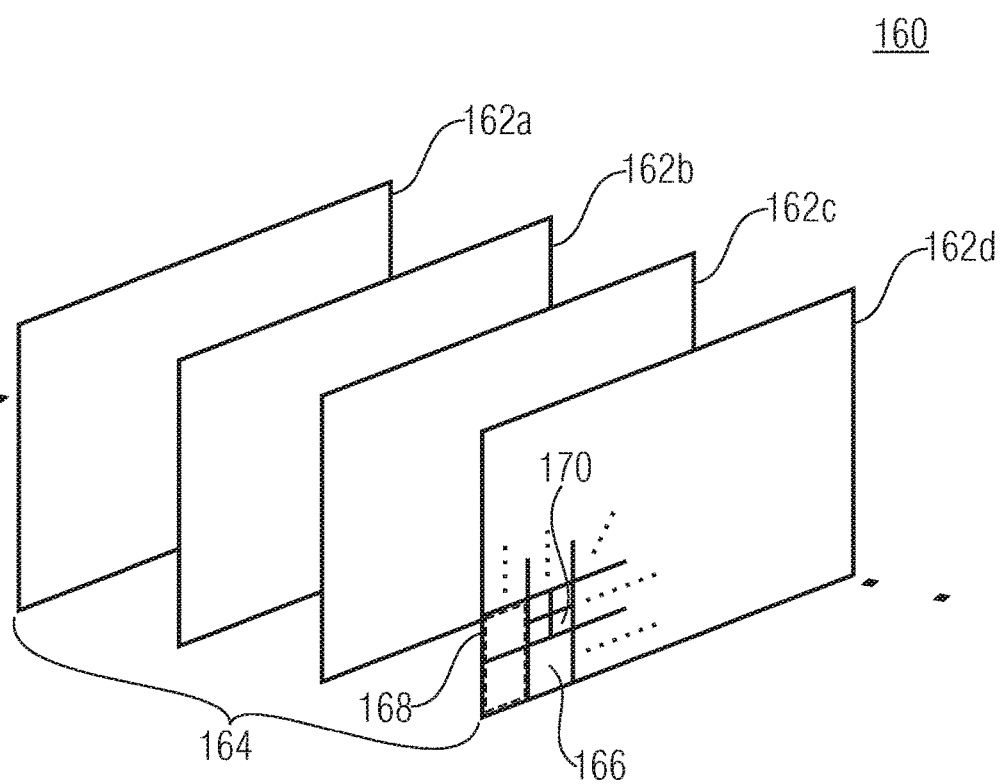
FIG. 4 a schematic of a video and its sub-division into picture sequences, pictures, macroblock pairs, macroblocks and transform blocks according to an embodiment.

In order to illustrate this. FIG. 4 shows a portion of a video 160 exemplary consisting of four consecutive pictures 162a to 162d of the video 160. In other words, the video 160 comprises a sequence of pictures 162 among which four are exemplary shown in FIG. 4. The video 160 may be divided-up into non-overlapping sequences of consecutive pictures for which global parameters or syntax elements are transmitted within the data stream 112. For illustration purposes only, it is assumed that the four consecutive pictures 162a to 162d shown in FIG. 4 shall form such sequence 164 of pictures. Each picture, in turn, is sub-divided into a plurality of macroblocks 166 as illustrated in the bottom left-hand corner of picture 162d. A macroblock is a container within which transformation coefficients along with other control syntax elements pertaining the kind of coding of the macroblock is transmitted within the bit-stream 112. A pair 168 of macroblocks 166 covers a continuous portion of the respective picture 162*d*. Depending on a macroblock pair mode of the respective macroblock pair 168, the top macroblock 162 of this pair 168 covers either the samples of the upper half of the macroblock pair 168 or the samples of every odd-numbered line within the macroblock pair 168, with the bottom macroblock relating to the other samples therein, respectively. Each macroblock 160, in turn, may be sub-divided into transform blocks as illustrated at 170, with these transform blocks forming the block basis at which the transform module 120 performs the transformation and the inverse transformation module 128 performs the inverse transformation.

Referring back to the just-mentioned global inverse tone mapping function, the prediction module 134 may be configured to use one or more such global inverse tone mapping functions constantly for the whole video 160 or, alternatively, for a sub-portion thereof, such as the sequence 164 of consecutive pictures or a picture 162 itself. The latter options would imply that the prediction module 134 varies the global inverse tone mapping function at a granularity corresponding to a picture sequence size or a picture size. Examples for global inverse tone mapping functions are given in the following. If the prediction module 134 adapts the global inverse tone mapping function to the statistics of the video 160, the prediction module 134 outputs information to the entropy coding module 140 or the multiplexer 144 so that the bit stream 112 contains information on the global inverse tone mapping function(s) and the variation thereof within the video 160. In case the one or more global inverse tone mapping functions used by the prediction module 134 constantly apply to the whole video 160, same may be ex ante known to the decoder or transmitted as side information within the bit stream 112.

At an even smaller granularity, a local inverse tone mapping function used by the prediction module 134 varies within the video 160. For example, such local inverse tone mapping function varies at a granularity smaller than a picture size such as, for example, the size of a macroblock, a macroblock pair or a transformation block size.

For both the global inverse tone mapping function(s) and the local inverse tone mapping function, the granularity at which the respective function varies or at which the functions are defined in bit stream 112 may be varied within the video 160. The variance of the granularity, in turn, may be signaled within the bit stream 112.

During the inverse tone mapping 150, the prediction module 134 maps a predetermined sample of the video 160 from the base quality bit-depth to the high quality bit-depth by use of a combination of one global inverse tone mapping function applying to the respective picture and the local inverse tone mapping function as defined in the respective block to which the predetermined sample belongs.

For example, the combination may be an arithmetic combination and, in particular, an addition. The prediction module may be configured to obtain a predicted high bit-depth sample value $S_{high}$ from the corresponding reconstructed low bit-depth sample value $S_{low}$ by use of $S_{high} = f_k(S_{low}) + m \cdot S_{low} + n$.

In this formula, the function $f_k$ represents a global inverse tone mapping operator wherein the index k selects which global inverse tone mapping operator is chosen in case more than one single scheme or more than one global inverse tone mapping function is used. The remaining part of this formula constitutes the local adaptation or the local inverse tone mapping function with n being an offset value and m being a scaling factor. The values of k, m and n can be specified on a block-by-block basis within the bit stream 112. In other words, the bit stream 112 would enable revealing the triplets {k, m, n} for all blocks of the video 160 with a block size of these blocks depending on the granularity of the local adaptation of the global inverse tone mapping function with this granularity, in turn, possibly varying within the video 160.

The following mapping mechanisms may be used for the prediction process as far as the global inverse time mapping function f(x) is concerned. For example, piece-wise linear mapping may be used where an arbitrary number of interpolation points can be specified. For example, for a base quality sample with value x and two given interpolation points $(x_n, y_n)$ and $(x_{n+1}, y_{n+1})$ the corresponding prediction sample y is obtained by the module 134 according to the following formula $$f(x) = y_n + \frac{x - x_n}{x_{n+1} - x_n}(y_{n+1} - y_n)$$

This linear interpolation can be performed with little computational complexity by using only bit shift instead of division operations if $x_{n+1} - x_n$ is restricted to be a power of two.

A further possible global mapping mechanism represents a look-up table mapping in which, by means of the base quality sample values, a table look-up is performed in a look-up table in which for each possible base quality sample value as far as the global inverse tone mapping function is concerned the corresponding global prediction sample value (x) is specified. The look-up table may be provided to the decoder side as side information or may be known to the decoder side by default.

Further, scaling with a constant offset may be used for the global mapping. According to this alternative, in order to achieve the corresponding high quality global prediction sample (x) having higher bit-depth, module 134 multiplies the base quality samples x by a constant factor $2^{M-N-K}$ and afterwards a constant offset $2^{M-1} - 2^{M-1-K}$ is added, according to, for example, one of the following formulae:

$$f(x) = 2^{M-N-K}x + 2^{M-1} - 2^{M-1-K} \text{ or}$$

$$f(x) = \min(2^{M-N-K}x + 2^{M-1} - 2^{M-1-K}, 2^M - 1), \text{ respectively,}$$

wherein M is the bit-depth of the high quality signal and N is the bit-depth of the base quality signal.

By this measure, the low quality dynamic range $[0; 2^N - 1]$ is mapped to the second dynamic range $[0; 2^M - 1]$ in a manner according to which the mapped values of x are distributed in a centralised manner with respect to the possible dynamic range $[0; 2^M - 1]$ of the higher quality within an extension which is determined by K. The value of K could be an integer value or real value, and could be transmitted as side information to the decoder within, for example, the quality-scalable data stream so that at the decoder some predicting means may act the same way as the prediction module 134 as will be described in the following. A round operation may be used to get integer valued f(x) values.

Another possibility for the global scaling is scaling with variable offset: the base quality samples x are multiplied by a constant factor, and afterwards a variable offset is added, according to, for example, one of the following formulae:

$$f(x)=2^{M-N-K}x+D \text{ or}$$

$$f(x)=\min(2^{M-N-K}x+D, 2^M-1)$$

By this measure, the low quality dynamic range is globally mapped to the second dynamic range in a manner according to which the mapped values of x are distributed within a portion of the possible dynamic range of the high-quality samples, the extension of which is determined by K, and the offset of which with respect to the lower boundary is determined by D. D may be integer or real. The result f(x) represents a globally mapped picture sample value of the high bit-depth prediction signal. The values of K and D could be transmitted as side information to the decoder within, for example, the quality-scalable data stream. Again, a round operation may be used to get integer valued f(x) values, the latter being true also for the other examples given in the present application for the global bit-depth mappings without explicitly stating it repeatedly.

An even further possibility for global mapping is scaling with superposition: the globally mapped high bit depth prediction samples f(x) are obtained from the respective base quality sample x according to, for example, one of the following formulae, where floor(a) rounds a down to the nearest integer:

$$f(x)=\text{floor}(2^{M-N}x+2^{M-2N}x) \text{ or}$$

$$f(x)=\text{floor}(2^{M-N}x+2^{M-2N}x), 2^M-1$$

The just mentioned possibilities may be combined. For example, global scaling with superposition and constant offset may be used: the globally mapped high bit depth prediction samples f(x) are obtained according to, for example, one of the following formulae, where floor (a) rounds a down to the nearest integer:

$$f(x)=\text{floor}(2^{M-N-K}x+2^{M-2N-K}x+2^{M-1}-2^{M-1-K})$$

$$f(x)=\min(\text{floor}(2^{M-N-K}x+2^{M-2N-K}x+2^{M-1}-2^{M-1-K}), 2^M-1)$$

The value of K may be specified as side information to the decoder.

Similarly, global scaling with superposition and variable offset may be used: the globally mapped high bit depth prediction samples (x) are obtained according to the following formula, where floor(a) rounds a down to the nearest integer:

$$f(x)=\text{floor}(2^{M-N-K}x+2^{M-2N-K}x+D)$$

$$f(x)=\min(\text{floor}(2^{M-N-K}x+2^{M-2N-K}x+D), 2^M-1)$$

The values of D and K may be specified as side information to the decoder.

Transferring the just-mentioned examples for the global inverse tone mapping function to FIG. 4, the parameters mentioned there for defining the global inverse tone mapping function, namely $(x_1,y_1)$, K and D, may be known to the decoder, may be transmitted within the bit stream 112 with respect to the whole video 160 in case the global inverse tone mapping function is constant within the video 160 or these parameters are transmitted within the bit stream for different portions thereof, such as, for example, for picture sequences 164 or pictures 162 depending on the coarse granularity underlying the global mapping function. In case the prediction module 134 uses more than one global inverse tone mapping function, the aforementioned parameters $(x_1, y_1)$, K and D may be thought of as being provided with an index $k^{th}$ with these parameters $(x_1,y_1)$, $K_k$ and $D_k$ defining the kth global inverse tone mapping function $f_k$.

Thus, it would be possible to specify usage of different global inverse tone mapping mechanisms for each block of each picture by signaling a corresponding value k within the bit stream 112 as well as, alternatively, using the same mechanism for the complete sequence of the video 160.

Further, it is possible to specify different global mapping mechanisms for the luma and the chroma components of the base quality signal to take into account that the statistics, such as their probability density function, may be different.

As already denoted above, the prediction module 134 uses a combination of the global inverse tone mapping function and a local inverse tone mapping function for locally adapting the global one. In other words, a local adaptation is performed on each globally mapped high bit-depth prediction sample f(x) thus obtained. The local adaptation of the global inverse tone mapping function is performed by use of a local inverse tone mapping function which is locally adapted by, for example, locally adapting some parameters thereof. In the example given above, these parameters are the scaling factor m and the offset value n. The scaling factors m and the offset value n may be specified on a block-by-block basis where a block may correspond to a transform block size which is, for example, in case of H.264/AVC 4×4 or 8×8 samples, or a macroblock size which is, in case of H.264/AVC, for example, 16×16 samples. Which meaning of "block" is actually used may either be fixed and, therefore, ex ante known to both encoder and decoder or it can be adaptively chosen per picture or per sequence by the prediction module 134, in which case it has to be signaled to the decoder as part of side information within the bit stream 112. In case of H.264/AVC, the sequence parameter set and/or the picture parameter set could be used to this end. Furthermore, it could be specified in the side information that either the scaling factor m or the offset value n or both values are set equal to zero for a complete video sequence or for a well-defined set of pictures within the video sequence 160. In case either the scaling factor m or the offset value n or both of them are specified on a block-by-block basis for a given picture, in order to reduce the necessitated bit-rate for coding of these values, only the difference values Δm, Δn to corresponding predicted values $m_{pred}, n_{pred}$ may be coded such that the actual values for m, n are obtainable as follows: $m=n_{pred}+\Delta m$, $n=n_{pred}+\Delta n$.

Figure 5:
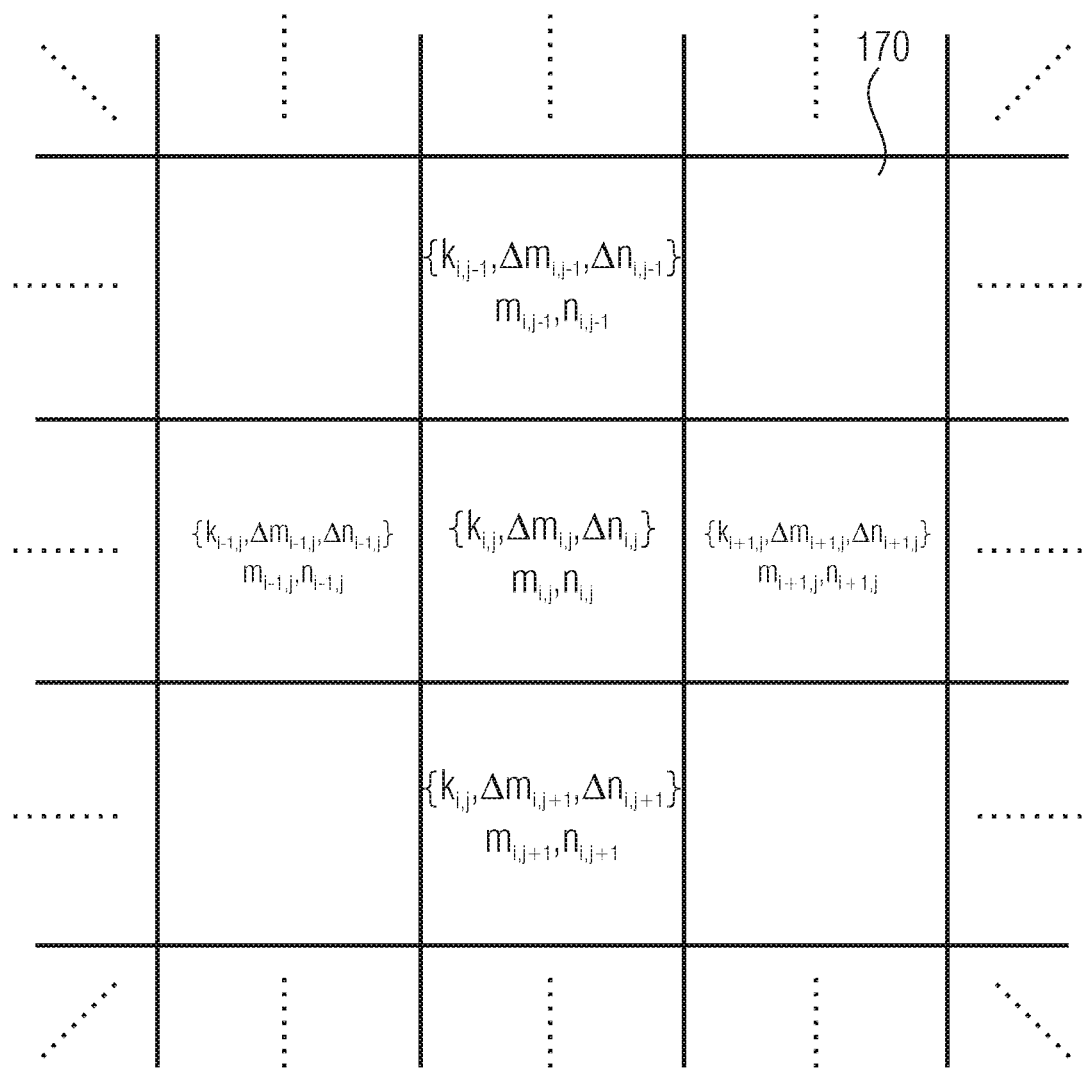
FIG. 5 a schematic of a portion of a picture, subdivided into blocks according to the fine granularity underlying the local mapping/adaptation function with concurrently illustrating a predictive coding scheme for coding the local mapping/adaptation function parameters according to an embodiment.

In other words and as illustrated in FIG. 5, which shows a portion of a picture 162 divided-up into blocks 170 forming the basis of the granularity of the local adaptation of the global inverse tone mapping function, the prediction module 134, the entropy coding module 140 and the multiplexer 144 are configured such that the parameters for locally adapting the global inverse tone mapping function, namely the scaling factor m and the offset value n as used for the individual blocks 170 are not directly coded into the bit stream 112, but merely as a prediction residual to a prediction obtained from scaling factors and offset values of neighboring blocks 170. Thus, {Δm, Δn, k} are transmitted for each block 170 in case more than one global mapping function is used as is shown in FIG. 5. Assume, for example, that the prediction module 134 used parameters $m_{i,j}$ and $n_{i,j}$ for inverse tone mapping the samples of a certain block i, j, namely the middle one of FIG. 5. Then, the prediction module 134 is configured to compute prediction values $m_{i,j,pred}$ and $n_{i,j,pred}$ from the scaling factors and offset values of neighboring blocks 170, such as, for example, $m_{i,j-1}$ and $n_{i,j-1}$. In this case, the prediction module 134 would cause the difference between the actual parameters $m_{i,j}$ and $n_{i,j}$ and the predicted ones $m_{i,j}-n_{i,j,pred}$ and $n_{i,j}-n_{i,j,pred}$ to be inserted into the bit-stream 112. These differences are denoted in FIG. 5 as $\Delta m_{i,j}$ and $\Delta n_{i,j}$ with the indicies i, j indicating the $j^{th}$ block from the top and the $i^{th}$ block from the left-hand side of the picture 162, for example. Alternatively, the prediction of the scaling factor m and the offset value n may be derived from the already transmitted blocks rather than neighboring blocks of the same picture. For example, the prediction values may be derived from the block 170 of the preceding picture lying at the same or a corresponding spatial location. In particular, the predicted value can be
 a fixed value, which is either transmitted in the side in-formation or already known to both encoder and decoder.
 the value of the corresponding variable and the preceding block,
 the median value of the corresponding variables in the neighboring blocks,
 the mean value of the corresponding variables in the neigh-boring blocks,
 a linear interpolated or extrapolated value derived from the values of corresponding variables in the neighboring blocks.

Which one of these prediction mechanisms is actually used for a particular block may be known to both encoder and decoder or may depend on values of m,n in the neighboring blocks itself, if there are any.

Within the coded high quality enhancement signal output by entropy coding module 140, the following information could be transmitted for each macroblock in case modules 136, 138 and 140 implement an H.264/AVC conforming encoding. A coded block pattern (CBP) information could be included indicating as to which of the four 8×8 luma transformation blocks within the macroblock and which of the associated chroma transformation blocks of the macroblock may contain non-zero transform coefficients. If there are no non-zero transform coefficients, no further information is transmitted for the particular macroblock. Further information could relate to the transform size used for coding the luma component, i.e. the size of the transformation blocks in which the macroblock consisting of 16×16 luma samples is transformed in the transform module 136, i.e. in 4×4 or 8×8 transform blocks. Further, the high quality enhancement layer data stream could include the quantization parameter QP used in the quantization module 138 for controlling the quantizer step-size. Further, the quantized transform coefficients, i.e. the transform coefficient levels, could be included for each macroblock in the high quality enhancement layer data stream output by entropy coding module 140.

Besides the above information, the following information should be contained within the data stream 112. For example, in case more than one single global inverse tone mapping scheme is used for the current picture, also the corresponding index value k has to be transmitted for each block of the high quality enhancement signal. As far as the local adaptation is concerned, the variables $\Delta m$ and $\Delta n$ may be signaled for each block of those pictures where the transmission of the corresponding values is indicated in the side information by means of, for example, the sequence parameter set and/or the picture parameter set in H.264/AVC. For all three new variables k. $\Delta m$ and $\Delta n$, new syntax elements with a corresponding binarization schemes have to be introduced. A simple unary binarization may be used in order to prepare the three variables for the binary arithmetic coding scheme used in H.264/AVC. Since all the three variables have typically small magnitudes, the simple unary binarization scheme is very well suited. Since $\Delta n$ and $\Delta n$ are signed integer values, they could be converted to unsigned values as described in the following Table:

| signed value of $\Delta m, \Delta n$ | unsigned value (to be binarized) |
|---|---|
| 0 | 0 |
| 1 | 1 |
| 2 | −1 |
| 3 | 2 |
| 4 | −2 |
| 5 | 3 |
| 6 | −3 |
| k | $(-1)^{k+1}\text{Ceil}(k \div 2)$ |

Figure 6:
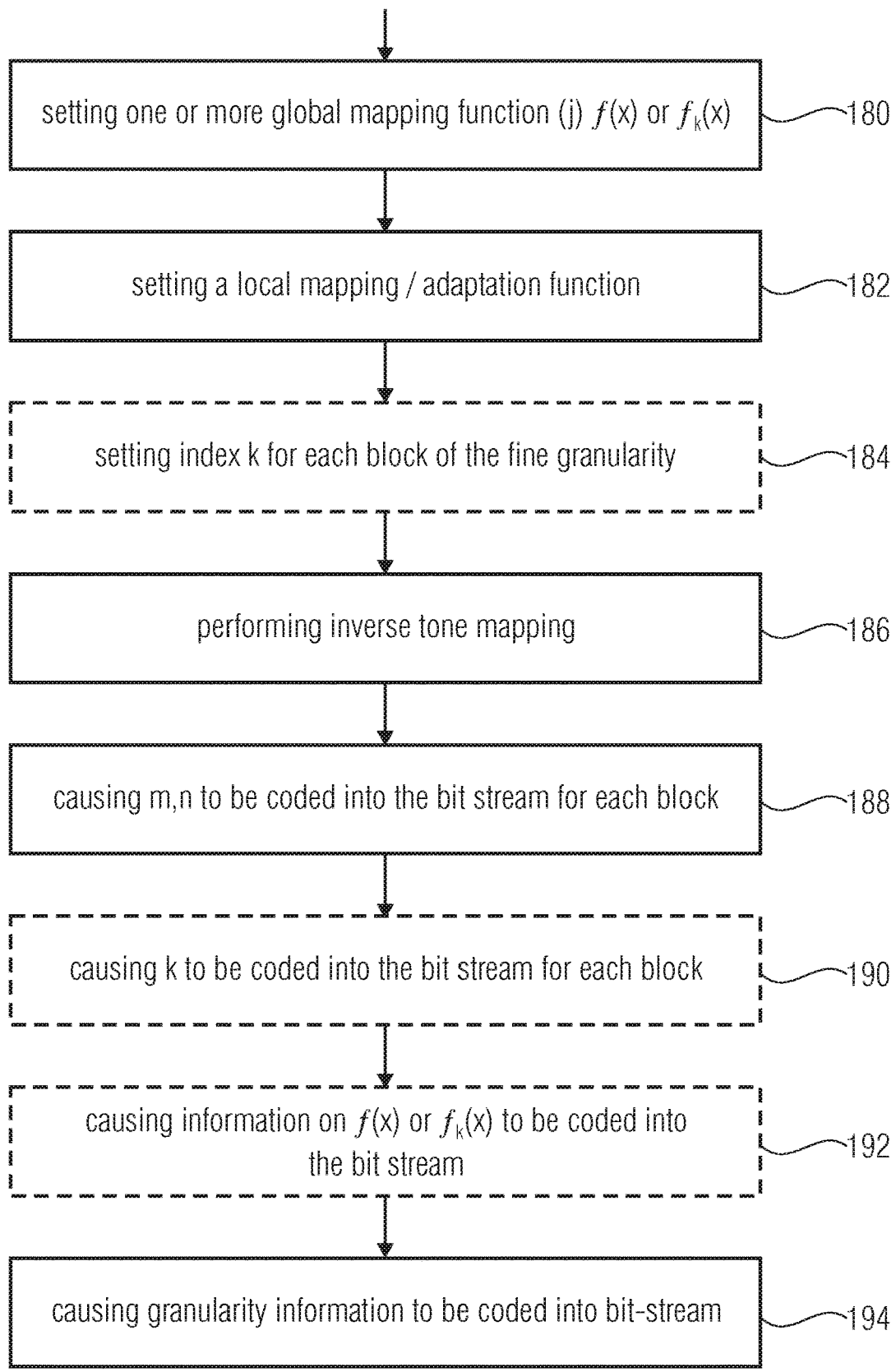
FIG. 6 a flow diagram for illustrating an inverse tone mapping process at the encoder according to an embodiment.

Thus, summarizing some of the above embodiments, the prediction means 134 may perform the following steps during its mode of operation. In particular, as shown in FIG. 6, the prediction means 134 sets, in step 180, one or more global mapping function(s) f(x) or, in case of more than one global mapping function, $f_k(x)$ with k denoting the corresponding index value pointing to the respective global mapping function. As described above, the one or more global mapping function (s) may be set or defined to be constant across the video 160 or may be defined or set in a coarse granularity such as, for example, a granularity of the size of a picture 162 or a sequence 164 of pictures. The one or more global mapping function (s) may be defined as described above. In general, the global mapping function(s) may be a non-trivial function, i.e. unequal to f(x)=constant, and may especially be a non-linear function. In any case, when using any of the above examples for a global mapping function, step 180 results in a corresponding global mapping function parameter, such as K,D or $(x_n,y_n)$ with n∈(1, . . . N) being set for each section into which the video is sub-divided according to the coarse granularity.

Further, the prediction module 134 sets a local mapping/adaptation function, such as that indicated above, namely a linear function according to m·x+n. However, another local mapping/adaptation function is also feasible such as a constant function merely being parametrized by use of an offset value. The setting 182 is performed at a finer granularity such as, for example, the granularity of a size smaller than a picture such as a macroblock, transform block or macroblock pair or even a slice within a picture wherein a slice is a sub-set of macroblocks or macroblock pairs of a picture. Thus, step 182 results, in case of the above embodiment for a local mapping/adaptation function, in a pair of values $\Delta m$, and $\Delta n$ being set or defined for each of the blocks into which the pictures 162 of the video are sub-divided according to the finer granularity.

Optionally, namely in case more than one global mapping function is used in step 180, the prediction means 134 sets, in step 184, the index k for each block of the fine granularity as used in step 182.

Although it would be possible for the prediction module 134 to set the one or more global mapping function(s) in step 180 solely depending on the mapping function used by the down conversion module 116 in order to reduce the sample bit-depth of the original picture samples, such as, for example, by using the inverse mapping function thereto as a global mapping function in step 180, it should be noted that it is also possible that the prediction means 134 performs all settings within steps 180, 182 and 184 such that a certain optimization criterion, such as the rate/distortion ratio of the resulting bit-stream 112 is extremized such as maximized or minimized. By this measure, both the global mapping function(s) and the local adaptation thereto, namely the local mapping/adaptation function are adapted to the sample value tone statistics of the video with determining the best compromise between the overhead of coding the needed side information for the global mapping on the one hand and achieving the best fit of the global mapping function to the tone statistics necessitating merely a small local mapping/adaptation function on the other hand.

In performing the actual inverse tone mapping in step 186, the prediction module 134 uses, for each sample of the reconstructed low-quality signal, a combination of the one global mapping function in case there is just one global mapping function or one of the global mapping functions in case there are more than one on the one hand, and the local mapping/adaptation function on the other hand, both as defined at the block or the section to which the current sample belongs. In the example above, the combination has been an addition. However, any arithmetic combination would also be possible. For example, the combination could be a serial application of both functions.

Further, in order to inform the decoder side about the used combined mapping function used for the inverse tone mapping, the prediction module 134 causes at least information on the local mapping/adaptation function to be provided to the decoder side via the bit-stream 112. For example, the prediction module 134 causes, in step 188, the values of m and n to be coded into the bit-stream 112 for each block of the fine granularity. As described above, the coding in step 188 may be a predictive coding according to which prediction residuals of m and n are coded into the bit-stream rather than the actual values itself, with deriving the prediction of the values being derived from the values of m and n at neighboring blocks 170 or of a corresponding block in a previous picture. In other words, a local or temporal prediction along with residual coding may be used in order to code parameter m and n.

Similarly, for the case that more than one global mapping function is used in step 180, the prediction module 134 may cause the index k to be coded into the bit-stream for each block in step 190. Further, the prediction module 134 may cause the information on f(x) or $f_k(x)$ to be coded into the bit-stream in case same information is not a priori known to the decoder. This is done in step 192. In addition, the prediction module 134 may cause information on the granularity and the change of the granularity within the video for the local mapping/adaptation function and/or the global mapping function(s) to be coded into the bit-stream in step 194.

It should be noted that all steps 180 to 194 do not need to be performed in the order mentioned. Even a strict sequential performance of these steps is not needed. Rather, the steps 180 to 194 are shown in a sequential order merely for illustrating purposes and these steps will be performed in an overlapping manner.

Although not explicitly stated in the above description, it is noted that the side information generated in steps 190 to 194 may be introduced into the high quality enhancement layer signal or the high quality portion of bit-stream 112 rather than the base quality portion stemming from the entropy coding module 142.

Figure 2:
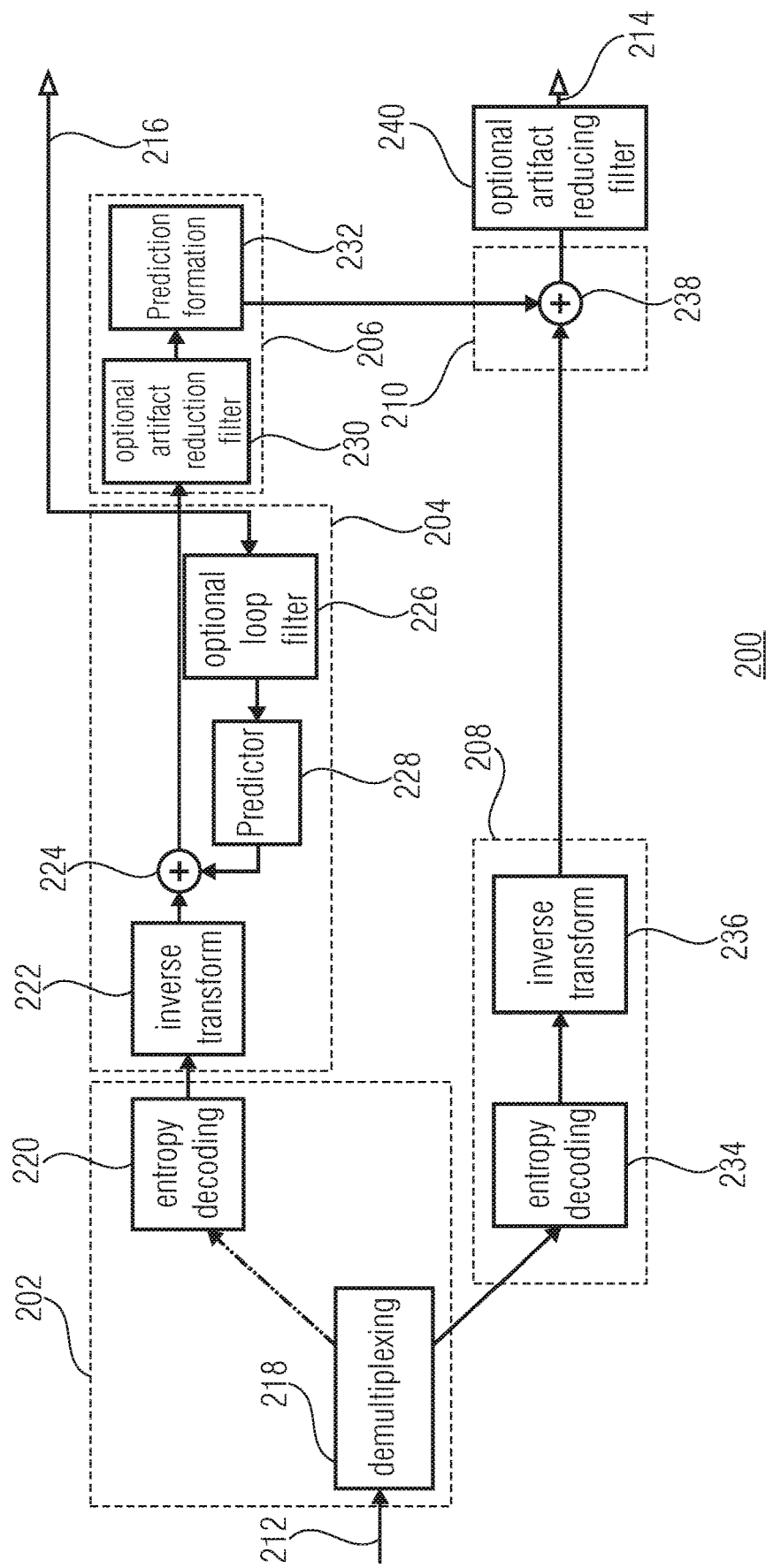
FIG. 2 a block diagram of a video decoder according to an embodiment of the present invention.

After having described an embodiment for an encoder, with respect to FIG. 2, an embodiment of a decoder is described. The decoder of FIG. 2 is indicated by reference sign 200 and comprises a de-multiplexing means 202, a base decoding means 204, a prediction means 206, a residual decoding means 208 and a reconstruction means 210 as well as an input 212, a first output 214 and a second output 216.

The decoder 200 receives, at its input 212, the quality-scalable data stream, which has, for example, been output by encoder 100 of FIG. 1. As described above, the quality scalability may relate to the bit-depth and, optionally, to the spatial reduction. In other words, the data stream at the input 212 may have a self-contained part which is isolatedly usable to reconstruct the video signal with a reduced bit-depth and, optionally, reduced spatial resolution, as well as an additional part which, in combination with the first part, enables reconstructing the video signal with a higher bit-depth and, optionally, higher spatial resolution. The lower quality reconstruction video signal is output at output 216, whereas the higher quality reconstruction video signal is output at output 214.

The demultiplexing means 202 divides up the incoming quality-scalable data stream at input 212 into the base encoding data stream and the high quality enhancement layer data stream, both of which have been mentioned with respect to FIG. 1. The base decoding means 204 is for decoding the base encoding data stream into the base quality representation of the video signal, which is directly, as it is the case in the example of FIG. 2, or indirectly via an artifact reduction filter (not shown), optionally outputable at output 216. Based on the base quality representation video signal, the prediction means 206 forms a prediction signal having the increased picture sample bit depth and/or the increased chroma sampling resolution. The decoding means 208 decodes the enhancement layer data stream to obtain the prediction residual having the increased bit-depth and, optionally, increased spatial resolution. The reconstruction means 210 obtains the high quality video signal from the prediction and the prediction residual and outputs same at output 214 via an optional artifact reducing filter.

Internally, the demultiplexing means 202 comprises a demultiplexer 218 and an entropy decoding module 220. An input of the demultiplexer 218 is connected to input 212 and a first output of the demultiplexer 218 is connected to the residual decoding means 208. The entropy-decoding module 220 is connected between another output of the demultiplexer 218 and the base decoding means 204. The demultiplexer 218 divides the quality-scalable data stream into the base layer data stream and the enhancement layer data stream as having been separately input into the multiplexer 144, as described above. The entropy decoding module 220 performs, for example, a Huffman decoding or arithmetic decoding algorithm in order to obtain the transform coefficient levels, motion vectors, transform size information and other syntax elements needed in order to derive the base representation of the video signal therefrom. At the output of the entropy-decoding module 220, the base encoding data stream results.

The base decoding means 204 comprises an inverse transform module 222, an adder 224, an optional loop filter 226 and a predictor module 228. The modules 222 to 228 of the base decoding means 204 correspond, with respect to functionality and interconnection, to the elements 124 to 130 of FIG. 1. To be more precise, the inverse transform module 222 and the adder 224 are connected in series in the order mentioned between the demultiplexing means 202 on the one hand and the prediction means 206 and the base quality output, respectively, on the other hand, and the optional loop filter 226 and the predictor module 228 are connected in series in the order mentioned between the output of the adder 224 and another input of the adder 224. By this measure, the adder 224 outputs the base representation video signal with the reduced bit-depth and, optionally, the reduced spatial resolution which is receivable from the outside at output 216.

The prediction means 206 comprises an optional artifact reduction filter 230 and a prediction information module 232, both modules functioning in a synchronous manner relative to the elements 132 and 134 of FIG. 1. In other words, the optional artifact reduction filter 230 optionally filters the base quality video signal in order to reduce artifacts therein and the prediction formation module 232 retrieves predicted pictures with increased bit depths and, optionally, increased spatial resolution in a manner already described above with respect to the prediction module 134. That is, the prediction information module 232 may, by means of side information contained in the quality-scalable data stream, map the incoming picture samples to a higher dynamic range and, optionally, apply a spatial interpolation filter to the content of the pictures in order to increase the spatial resolution.

The residual decoding means 208 comprises an entropy decoding module 234 and an inverse transform module 236, which are serially connected between the demultiplexer 218 and the re-construction means 210 in the order just mentioned. The entropy decoding module 234 and the inverse transform module 236 cooperate to reverse the encoding performed by modules 136, 138, and 140 of FIG. 1. In particular, the entropy-decoding module 234 performs, for example, a Huffman decoding or arithmetic decoding algorithms to obtain syntax elements comprising, among others, transform coefficient levels, which are, by the inverse transform module 236, inversely transformed to obtain a prediction residual signal or a sequence of residual pictures. Further, the entropy decoding module 234 reveals the side information generated in steps 190 to 194 at the encoder side so that the prediction formation module 232 is able to emulate the inverse mapping procedure performed at the encoder side by the prediction module 134, as already denoted above.

Figure 7:
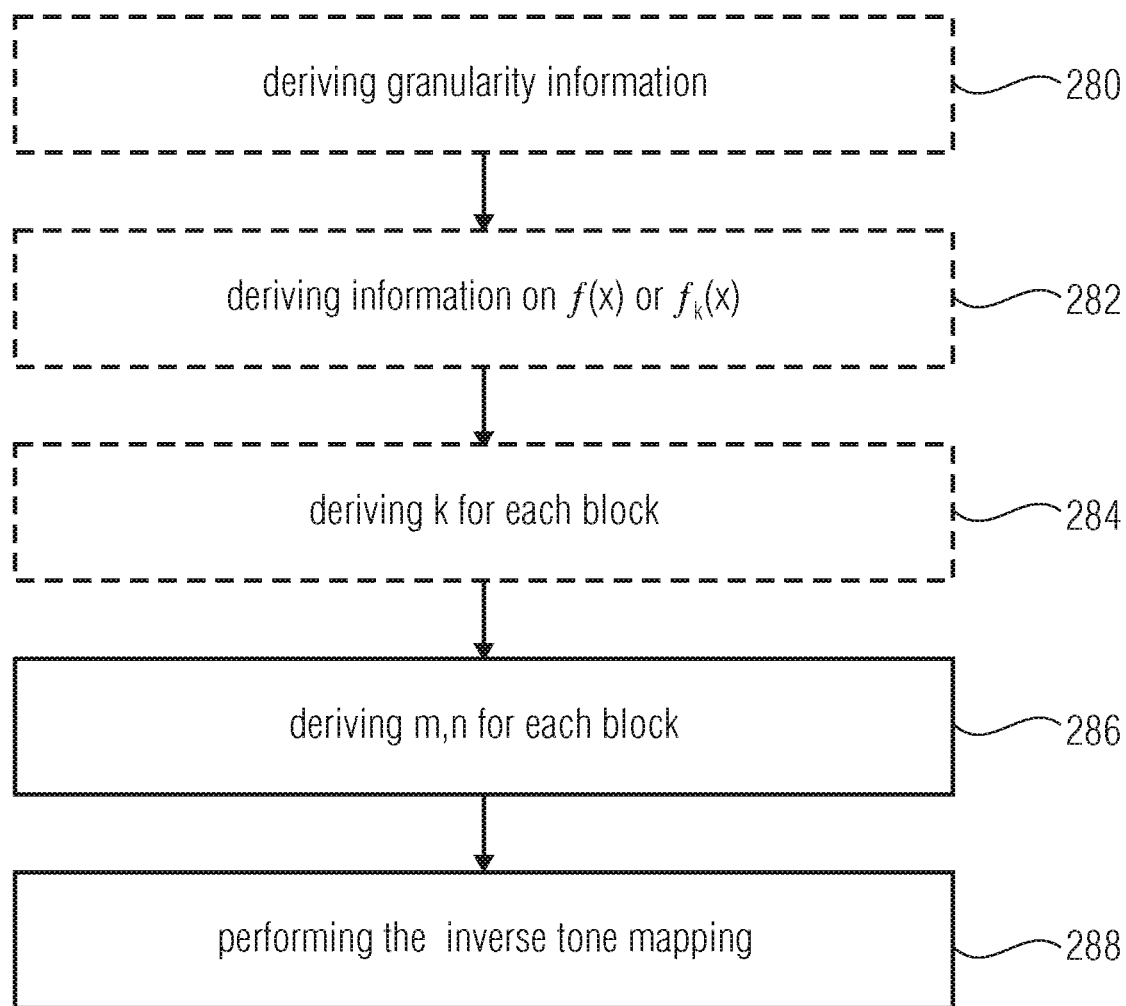
FIG. 7 a flow diagram of an inverse tone mapping process at the decoder corresponding to that of FIG. 6, according to an embodiment.
Figure 8:
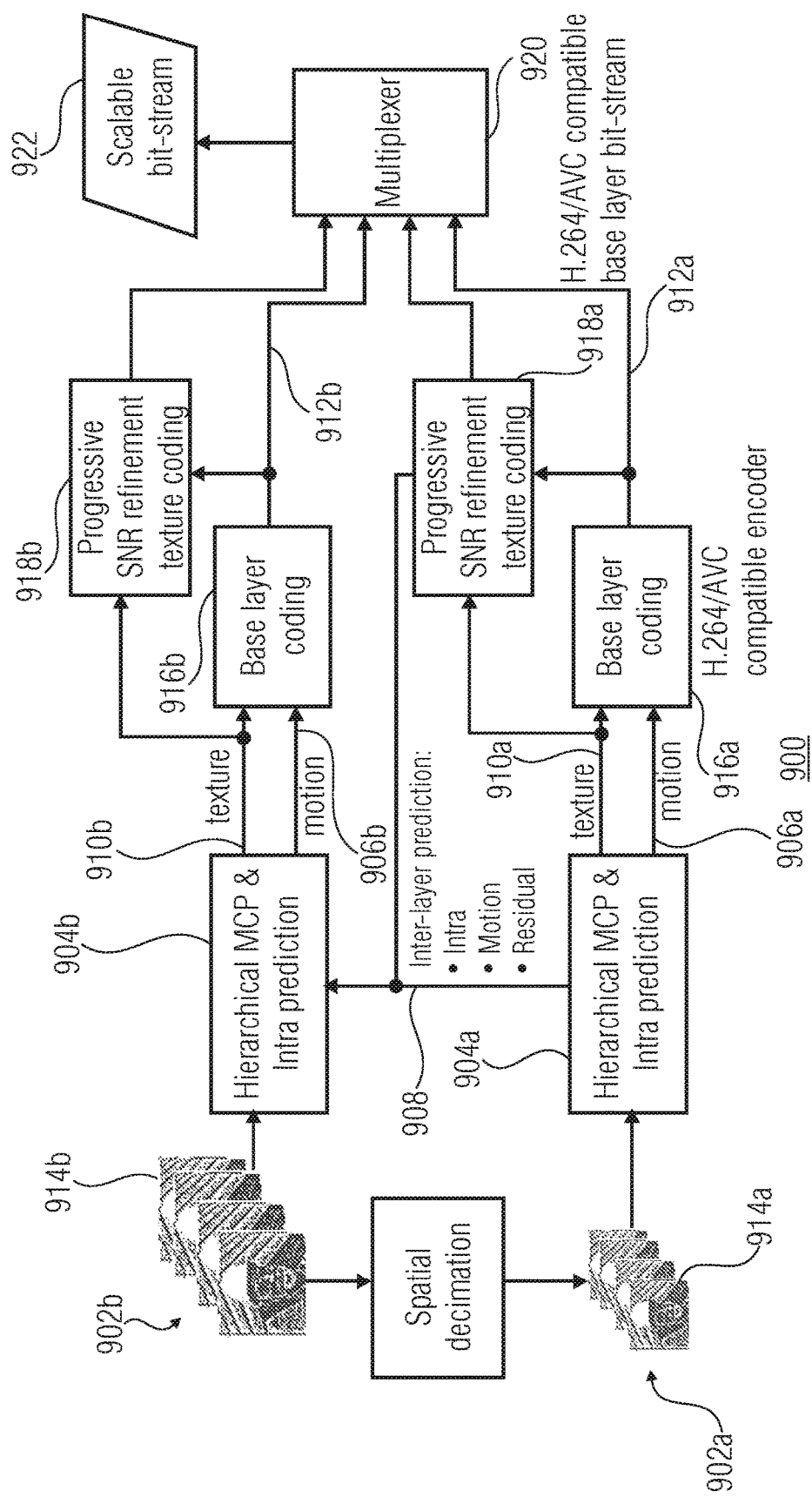
FIG. 8 a block diagram of a conventional coder structure for scalable video coding.

Similar to FIG. 6, which referred to the encoder. FIG. 7 shows the mode of operation of the prediction formation module 232 and, partially, the entropy decoding module 234 in more detail. As shown therein, the process of gaining the prediction from the reconstructed base layer signal at the decoder side starts with a co-operation of demultiplexer 218 and entropy decoder 234 to derive the granularity information coded in step 194 in step 280, derive the information on the global mapping function(s) having been coded in step 192 in step 282, derive the index value k for each block of the fine granularity as having been coded in step 190 in step 284, and derive the local mapping/adaptation function parameter m and n for each fine-granularity block as having been coded in step 188 in step 286. As illustrated by way of the dotted lines, steps 280 to 284 are optional with its appliance depending on the embodiment currently used.

In step 288, the prediction formation module 232 performs the inverse tone mapping based on the information gained in steps 280 to 286, thereby exactly emulating the inverse tone mapping having been performed at the encoder side at step 186. Similar to the description with respect to step 188, the derivation of parameters m, n may comprise a predictive decoding where a prediction residual value is derived from the high quality part of the data-stream entering demultiplexer 218 by use of, for example, entropy decoding as performed by entropy decoder 234, and obtaining the actual values of m and n by adding these prediction residual values to a prediction value derived by local and/or temporal prediction.

The reconstruction means 210 comprises an adder 238 the inputs of which are connected to the output of the prediction in-formation module 232, and the output of the inverse transform module 236, respectively. The adder 238 adds the prediction residual and the prediction signal in order to obtain the high quality video signal having the increased bit depth and, optionally, increased spatial resolution which is fed via an optional artifact reducing filter 240 to output 214.

Thus, as is derivable from FIG. 2, a base quality decoder may reconstruct a base quality video signal from the quality-scalable data stream at the input 212 and may, in order to do so, not include elements 230, 232, 238, 234, 236, and 240. On the other hand, a high quality decoder may not include the output 216.

In other words, in the decoding process, the decoding of the base quality representation is straightforward. For the decoding of the high quality signal, first the base quality signal has to be decoded, which is performed by modules 218 to 228. Thereafter, the prediction process described above with respect to module 232 and optional module 230 is employed using the decoded base representation. The quantized transform coefficients of the high quality enhancement signal are scaled and inversely transformed by the inverse transform module 236, for example, as specified in H.264/AVC in order to obtain the residual or difference signal samples, which are added to the prediction derived from the decoded base representation samples by the prediction module 232. As a final step in the decoding process of the high quality video signal to be output at output 214, optional a filter can be employed in order to remove or reduce visually disturbing coding artifacts. It is to be noted that the motion-compensated prediction loop involving modules 226 and 228 is fully self-contained using only the base quality representation. Therefore, the decoding complexity is moderate and there is no need for an interpolation filter, which operates on the high bit depth and, optionally, high spatial resolution image data in the motion-compensated prediction process of predictor module 228.

Regarding the above embodiments, it should be mentioned that the artifact reduction filters 132 and 230 are optional and could be removed. The same applies for the loop filters 124 and 226, respectively, and filter 240. For example, with respect to FIG. 1, it had been noted that the filters 124 and 132 may be replaced by just one common filter such as, for example, a deblocking filter, the output of which is connected to both the input of the motion prediction module 126 as well as the input of the inverse tone mapping module 134. Similarly, filters 226 and 230 may be replaced by one common filter such as, a de-blocking filter, the output of which is connected to output 216, the input of prediction formation module 232 and the input of predictor 228. Further, for the sake of completeness, it is noted that the prediction modules 228 and 126, respectively, not necessarily temporally predict samples within macroblocks of a current picture. Rather, a spatial prediction or intra-prediction using samples of the same picture may also be used. In particular, the prediction type may be chosen on a macroblock-by-macroblock basis, for example, or some other granularity. Further, the present invention is not restricted to video coding. Rather, the above description is also applicable to still image coding. Accordingly, the motion-compensated prediction loop involving elements 118, 128, 130, 126, and 124 and the elements 224, 228, and 226, respectively, may be removed also. Similarly, the entropy coding mentioned needs not necessarily to be performed.

Even more precise, in the above embodiments, the base layer encoding 118-130, 142 was based on motion-compensated prediction based on a reconstruction of already lossy coded pictures. In this case, the reconstruction of the base encoding process may also be viewed as a part of the high-quality prediction forming process as has been done in the above description. However, in case of a lossless encoding of the base representation, a reconstruction would not be needed and the down-converted signal could be directly forwarded to means 132, 134, respectively. In the case of no motion-compensation based prediction in a lossy base layer encoding, the reconstruction for reconstructing the base quality signal at the encoder side would be especially dedicated for the high-quality prediction formation in 104. In other words, the above association of the elements 116-134 and 142 to means 102, 104 and 108, respectively, could be performed in another way. In particular, the entropy coding module 142 could be viewed as a part of base encoding means 102, with the prediction means merely comprising modules 132 and 134 and the combining means 108 merely comprising the multiplexer 144. This view correlates with the module/means association used in FIG. 2 in that the prediction means 206 does not comprise the motion compensation based prediction. Additionally, however, demultiplexing means 202 could be viewed as not including entropy module 220 so that base decoding means also comprises entropy decoding module 220. However, both views lead to the same result in that the prediction in 104 is performed based on a representation of the source material with the reduced bit-depth and, optionally, the reduced spatial resolution which is losslessly coded into and losslessly derivable from the quality-scalable bit stream and base layer data stream, respectively. According to the view underlying FIG. 1, the prediction 134 is based on a reconstruction of the base encoding data stream, whereas in case of the alternative view, the reconstruction would start from an intermediate encoded version or halfway encoded version of the base quality signal which misses the lossless encoding according to module 142 for being completely coded into the base layer data stream. In this regard, it should be further noted that the down-conversion in module 116 does not have to be performed by the encoder 100. Rather, encoder 100 may have two inputs, one for receiving the high-quality signal and the other for receiving the down-converted version, from the outside.

In the above-described embodiments, the quality-scalability did merely relate to the bit depth and, optionally, the spatial resolution. However, the above embodiments may easily be extended to include temporal scalability, chroma format scalability, and fine granular quality scalability.

Accordingly, the above embodiments of the present invention form a concept for scalable coding of picture or video content with different granularities in terms of sample bit-depth and, optionally, spatial resolution by use of locally adaptive inverse tone mapping. In accordance with embodiments of the present invention, both the temporal and spatial prediction processes as specified in the H.264/AVC scalable video coding extension are extended in a way that they include mappings from lower to higher sample bit-depth fidelity as well as, optionally, from lower to higher spatial resolution. The above-described extension of SVC towards scalability in terms of sample bit-depth and, optionally, spatial resolution enables the encoder to store a base quality representation of a video sequence, which can be decoded by any legacy video decoder together with an enhancement signal for higher bit-depth and, optionally, higher spatial resolution, which is ignored by legacy video decoders. For example, the base quality representation could contain an 8-bit version of the video sequence in GIF resolution, namely 352×288 samples, while the high quality enhancement signal contains a "refinement" to a 10 bit version in 4CIF resolution, i.e. 704×476 samples of the same sequence. In a different configuration, it is also possible to use the same spatial resolution for both base and enhancement quality representations, such that the high quality enhancement signal only contains a refinement of the sample bit-depth, e.g. from 8 to 10 bits.

In other words, the above-outlined embodiments enable to form a video coder, i.e. encoder or decoder, for coding, i.e. encoding or decoding, a layered representation of a video signal comprising a standardized video coding method for coding a base-quality layer, a prediction method for performing a prediction of the high-quality enhancement layer signal by using the reconstructed base-quality signal and a residual coding method for coding of the prediction residual of the high-quality enhancement layer signal. In this regard, the prediction may be performed by using a mapping function from the dynamic range associated with the base-quality layer to the dynamic range associated with the high-quality enhancement layer. Further, the mapping function may be built as the sum of a global mapping function, which follows the inverse tone mapping schemes described above and a local adaptation. The local adaptation, in turn, may be performed by scaling the sample values x of the base quality layer and adding an offset value according to m·xn. In any case, the residual coding may be performed according to H.264/AVC.

Depending on an actual implementation, the inventive coding scheme can be implemented in hardware or in software. Therefore, the present invention also relates to a computer program, which can be stored on a computer-readable medium such as a CD, a disc or any other data carrier. The present invention is, therefore, also a computer program having a program code which, when executed on a computer, performs the inventive method described in connection with the above figures. In particular, the implementations of the means and modules in FIGS. 1 and 2 may comprise sub-routines running on a CPU, circuit parts of an ASIC or the like, for example.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for decoding a data stream into which picture data of a picture of a video is encoded, the method comprising:
   extracting, from the data stream, a first syntax element representing a fixed value associated with a variable parameter, wherein the variable parameter and an offset parameter define a local mapping function corresponding to a first block of a lower quality reconstructed picture;
   determining the variable parameter based on the fixed value; and
   forming a higher quality reconstructed picture by applying a global mapping function to modify sample values of the lower quality reconstructed picture, and applying the local mapping function using the variable parameter and the offset parameter to further modify a subset of sample values obtained after applying the global mapping function, wherein the subset includes the first block in the lower quality reconstructed picture.

2. The method of claim 1, wherein sample values of the higher quality reconstructed picture are at a bit depth greater than the sample values of the lower quality reconstructed picture.

3. The method of claim 1, wherein different local mapping functions are applied to different blocks corresponding to the lower quality reconstructed picture.

4. The method of claim 3, wherein the different blocks are of different sizes.

5. The method of claim 1, wherein the local mapping function and the global mapping function are decoded from the data stream.

6. The method of claim 1, wherein the local mapping function is linear and the global mapping function is non-linear.

7. The method of claim 1, wherein the local mapping function is used to further modify the subset of samples by addition of an output value of the local mapping function to an output value of the global mapping function applied to the subset of samples.

8. The method of claim 1, further comprising extracting, from the data stream, a second syntax element representing a difference value associated with the variable parameter, wherein the variable parameter is determined based on a combination of the fixed value and the difference value.

9. An apparatus to decode a data stream into which picture data of a picture of a video is encoded, the apparatus comprising:
a processor; and
a mapper configured to, using the processor:
extract, from the data stream, a first syntax element representing a fixed value associated with a variable parameter, wherein the variable parameter and an offset parameter define a local mapping function corresponding to a first block of a lower quality reconstructed picture;
determine the variable parameter based on the fixed value; and
form a higher quality reconstructed picture by applying a global mapping function to modify sample values of the lower quality reconstructed picture and applying the local mapping function using the variable parameter and the offset parameter to further modify a subset of sample values obtained after applying the global mapping function, wherein the subset includes the first block in the lower quality reconstructed picture.

10. The apparatus of claim 9, wherein sample values of the higher quality reconstructed picture are at a bit depth greater than the sample values of the lower quality reconstructed picture.

11. The apparatus of claim 9, wherein different local mapping functions are applied to different blocks corresponding to the lower quality reconstructed picture.

12. The apparatus of claim 9, wherein the local mapping function and the global mapping function are decoded from the data stream.

13. The apparatus of claim 9, wherein the mapper comprises subroutines running on a CPU.

14. The apparatus of claim 9, wherein the mapper comprises circuit parts of an ASIC.

15. The apparatus of claim 9, wherein the mapper is configured to extract, from the data stream, a second syntax element representing a difference value associated with the variable parameter, and determine the variable parameter based on a combination of the fixed value and the difference value.

* * * * *